UNITED STATES PATENT OFFICE.

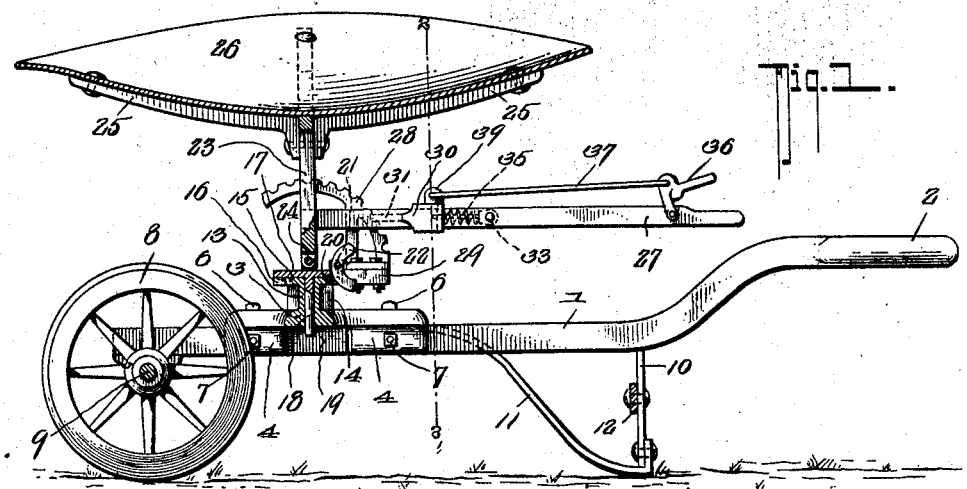
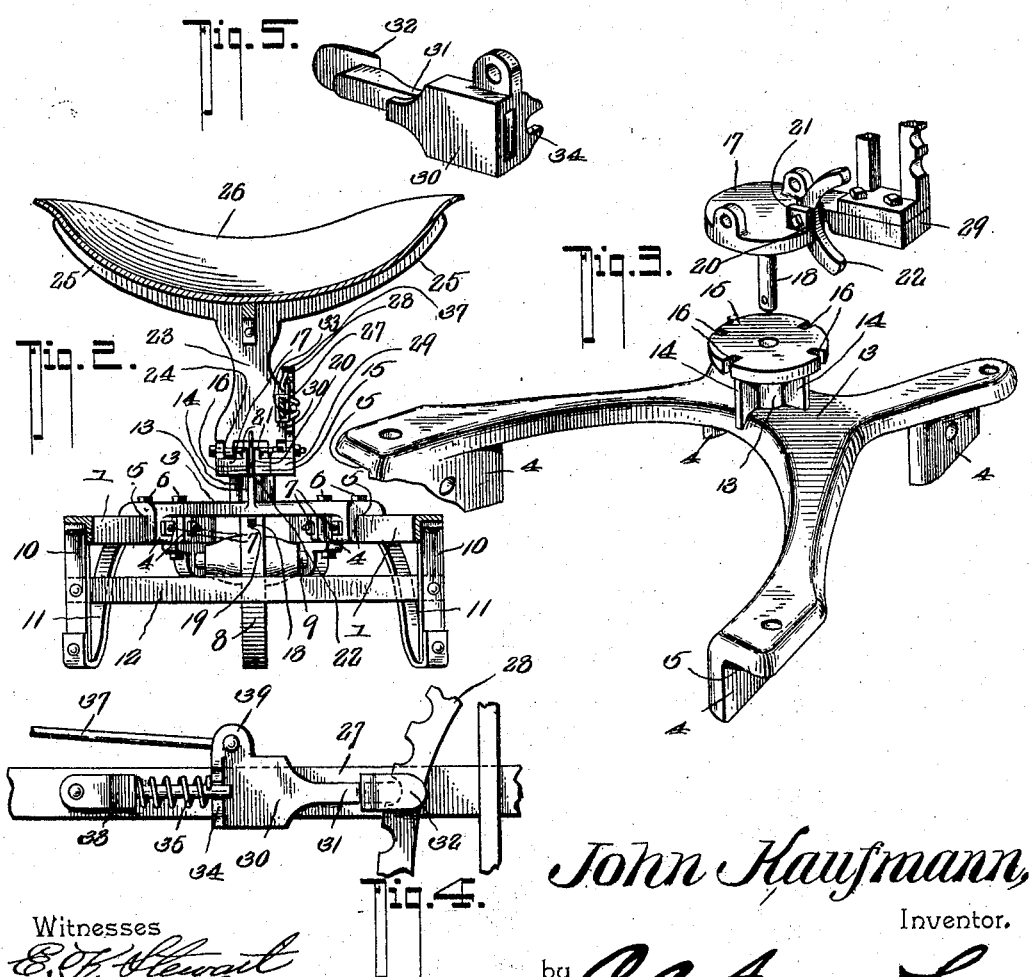

JOHN KAUFMANN, OF PRAIRIE DU SAC, WISCONSIN.

WHEELBARROW.

No. 800,159.　　　　　Specification of Letters Patent.　　　Patented Sept. 26, 1905.

Application filed February 11, 1905. Serial No. 245,251.

*To all whom it may concern:*

Be it known that I, JOHN KAUFMANN, a citizen of the United States, residing at Prairie du Sac, in the county of Sauk and State of Wisconsin, have invented a new and useful Wheelbarrow, of which the following is a specification.

This invention relates to hand-trucks, and has for its object to provide an improved device of this character which is particularly adapted for use as a wheelbarrow wherein the body is capable of being adjustably turned upon the frame of the device and tilted in any adjusted position to facilitate dumping and to enable the convenient handling of the device under all conditions.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the accompanying drawings, Figure 1 is a longitudinal sectional view of a wheelbarrow embodying the features of the present invention. Fig. 2 is a cross-sectional view on the line 2 2 of Fig. 1. Fig. 3 is an enlarged detail perspective view of a portion of the frame of the device. Fig. 4 is a detail elevation showing the ratchet mechanism of the controlling-lever. Fig. 5 is a detail perspective view of the slidable dog.

Like characters of reference designate corresponding parts in each and every figure of the drawings.

The frame of the present device includes a pair of longitudinal frame-bars 1, preferably in the nature of angle-bars, each of which has its rear end deflected upwardly and rounded to form a handle 2. Located between the side bars and slightly in rear of the forward ends thereof is a substantially H-shaped crosshead which is provided at each extremity with a pendent flange 4, constituting an angular seat 5 for the reception of the adjacent side bar 1, which is riveted to the top and side of the seat, as indicated at 6 and 7. A suitable supporting-wheel 8 is mounted upon a shaft 9, which is carried by the forward ends of the side bars 1 of the frame. At a suitable distance in rear of the cross-head 3 a leg-standard 10 depends from each side bar 1, and a brace 11 inclines upwardly and forwardly from the lower end of the leg-standard and is connected to the under side of the horizontal flange of the adjacent side bar, preferably by means of the adjacent fastening 6, the lower rear end of the brace being disposed in a substantially horizontal position, so as to form a shoe or runner. The opposite leg-standards are furthermore braced by a cross-bar 12, which connects the same intermediate of their ends.

At the center of the cross-head 3 there is an upstanding tubular socket 13, which is open at opposite ends, is braced by radial ribs or webs 14, and is provided at its upper end with a substantially circular head 15, flat upon its top and provided with an annular series of edge notches or seats 16. Upon the top of the head 15 is a rotatable disk 17, having a central pendent stem 18, rotatably fitted in the socket 13, there being a removable pin or key 19 piercing the lower projected end of the stem at the under side of the cross-head, so as to prevent accidental endwise displacement of the stem. This disk is provided with an edge notch 20, a pair of ears 21, rising from the disk at opposite sides of the notch therein, and a gravity-latch 22, pivotally supported between the ears 21 and working in the notch 20, said latch being designed to engage any one of the seats or notches 16 in the head 15, and thereby lock the rotatable member in different adjusted positions.

Rising centrally above the rotatable member or turn-table 17 is a standard 23, having its lower end hinged to the turn-table, as indicated at 24, in any suitable manner, preferably by means of knuckles or ears carried by the turn-table and the standard, and a pin or pintle piercing said ears or knuckles. Radial arcuate bars 25 are carried by the top of the standard and form a dished seat to receive the dished metallic body 26 of the wheelbarrow, which is therefore movable with the standard and capable of being tilted therewith. To control the tilting movements of the standard, there is a substantially horizontal hand-lever 27, rigidly connected to the standard and extending rearwardly therefrom into convenient access by persons standing at the handles of the frame of the wheelbarrow. At one side of this lever is an arcuate rack 28, rising from an arm or extension 29 of the turn-table or rotatable member 17. The lever 27 carries a dog coöperating with the rack, consisting of a slide in the nature of a box or casing 30, slidably embracing the lever and provided at its forward end with a projection 31 to engage the rack, there being an offset guard projection 32 lapping the other side of the rack. An offset guide member 33 is carried by the outer side of the lever and has its forward end extending through a perforate ear 34, carried by the rear end of the slide 30, there being a helical spring 35 embracing the guide member and bearing against the rear end of the latter and the rear end of the slide, so as to yieldably maintain the dog or projection 31 in engagement with the rack. A dog-releasing lever 36 is fulcrumed upon the main lever 27 near its rear end, and a rod or wire 37 extends between the bell-crank lever 36 and the slide 30, preferably by being engaged with an upstanding ear 39 upon the slide, whereby the latter may be withdrawn against the tension of the spring 35 to release the dog from the rack, and thereby permit tilting of the standard by manipulation of the lever 27.

From the foregoing description it will be understood that the side bars 1 are rigidly connected by the substantially H-shaped crosshead, thereby producing a strong and rigid truck-frame, while the body 26 is mounted to rotate with the turn-table 17 upon the crosshead, so as to permit of the body being turned crosswise of the frame whenever desired, and the standard 23 is mounted to tilt vertically upon its hinged connection with the turn-table, so as to provide for dumping the body 26. To turn and dump the body 26, the latch 22 is released by the foot and the lever 27 is manipulated to adjustably rotate the turn-table to the desired position, whereupon the latch 22 is permitted to engage one of the seats or notches of the head 15, so as to hold the turn-table against rotation. After the body has thus been turned the lever 27 is released from the rack 28 and then is moved vertically to tilt the standard 23, and thereby dump the body 26 in a very simple and expeditious manner.

Having fully described the invention, what is claimed is—

1. A hand-truck comprising a wheeled frame, a socket carried by the frame and provided with an external annular series of seats, a turn-table having a stem rotatably mounted in the socket, a latch carried by the turn-table in coöperative relation with the seats of the socket to adjustably lock the turn-table, and a body carried by the turn-table.

2. A hand-truck comprising a wheeled frame, a bearing provided upon the frame and surrounded by a concentric series of seats, a turn-table mounted upon the bearing, a gravity-latch carried by the turn-table in coöperative relation with the seats, and a body supported upon the turn-table.

3. A hand-truck comprising a wheeled frame, a circular bearing having a peripheral series of notches, a turn-table mounted upon the bearing and provided with a peripheral notch and upstanding ears at opposite sides of the notch, a latch pivoted between the ears and working in the notch of the turn-table in coöperative relation with the peripheral notches of the bearing, and a body supported upon the turn-table.

4. A hand-truck comprising a wheeled frame, an upstanding bearing-socket provided upon the frame and having an external annular series of seats, a turn-table mounted upon the frame and provided with a latch in coöperative relation with the seats of the bearing, a standard hinged to the turn-table, a body carried by the standard, a rack carried by the turn-table, and a lever carried by the standard and having a dog engaging the rack.

In testimony that I claim the foregoing as my own I have hereto affixed my signature in the presence of two witnesses.

JOHN KAUFMANN.

Witnesses:
J. S. TRIPP,
C. I. KINDSCHI.